United States Patent Office 3,461,287
Patented Aug. 12, 1969

3,461,287
FERROCENE DERIVATIVES AS ULTRAVIOLET ABSORBERS AND SCINTILLATION AGENTS
Charanjit Rai, Crystal Lake, Ill., assignor, by mesne assignments, to Union Oil Company of California, Los Angeles, Calif., a corporation of California
No Drawing. Filed July 17, 1963, Ser. No. 295,830
Int. Cl. G01t 1/20; G03c 1/84; C08f 45/54
U.S. Cl. 250—71.5          5 Claims This invention relates to the use of certain new ferrocene derivatives and plastic compositions and coatings containing same as effective ultraviolet absorbers. More particularly this invention relates to ultraviolet light absorbers and scintillation agents comprising arylthiazolylferrocenes, aryloxazolylferrocenes, arylimidazolylferrocenes, arylthiazolylalkylferrocenes, aryloxazolylalkylferrocenes, arylimidazolylalkylferrocenes, aryloxazolylarylferrocenes, arylimidazolylarylferrocenes, and arylthiazolylarylferrocenes and the bis-compounds thereof. This invention is based on the discovery that these new ferrocene derivatives are effective at low concentrations in stabilizing plastics against photocatalyzed deterioration, in packaging and coating materials for the purpose of making the film capable of screening out ultraviolet light, and in apparatus designed to measure electromagnetic or corpuscular radiation from naturally occurring or artificially produced radioactive isotopes.

One of the important attributes of synthetic resins of all types is their unusually good properties for most applications involving normal environments of temperature, weathering or chemical exposures, obtained by selection of the raw materials. Also synthetic resins are versatile in that it is possible to provide more resistance or special properties for uses involving exposure to fire, weathering, high temperatures, and chemicals. Other variables enter into the durability of resins such as the type of filler, the temperature of cure, type of catalyst and accelerator, the integrity of the reinforced structure with respect to its uniformity, the presence of voids, resin-rich and filler-rich areas, the completeness of the curing reaction, the presence or absence of conditions leading to stress fatigue in the film or structure, and the uniformity and severity of exposure to adverse conditions which cause deterioration.

Resin structures are often and of necessity exposed to outdoor conditions and in such applications other factors occurring simultaneously such as mechanical abuse and chemical exposure, accentuate the deterioration. Aside from other variables such as composition, molecular weight, completeness of cure and type or amount of cross-linking monomer, one important variable which controls the durability of polyester resins, for example, is the type, concentration and effectiveness of the ultraviolet light absorbing agent. Some of the prior art ultraviolet light absorbers are phenylsalicylate, the benzophenones, orthohydroxybenzophenones, 2,4 - dihydroxybenzophenone, 2-hydroxy-4-methoxybenzophenone; 2,2′-dihydroxy-4 - methoxybenzophenone; 2,4 - dibenzoylresorcinol and p,t-butyl esters of salicylic acid.

The proper selection of an ultraviolet absorber to give the best results in a specific plastic requires a knowledge of the wavelengths of light that cause the most degradation. This property is measured by a heliostat.

Liquid scintillation or liquid phosphor counting is a relatively new technique developed in the past few years for the determination of beta activity of compounds, e.g., carbon 14 and tritium counting. One of the main problems has been overcoming the factors which prevent the radiation from reaching the detector—self-absorption, geometry, scatter, and absorption by air and counter windows. Three basic requirements for good counting results are (1) the radioactive sample must be in good contact with the scintillator, (2) the scintillator must emit a strong flash of light, and (3) the counting mixture must be reasonably transparent to the light flashes.

The best contact between the radioactive sample and the scintillator is obtained when both the sample and scintillator are dissolved in the same solvent, called the primary solvent. However, only a few substances have been found which act as scintillators, and only a few solvents are known having the ability to dissolve or suspend the sample and act to transfer the energy absorbed from the beta particles to the scintillator. Also a great many substances, known as "quenches," if present in the scintillating solution, inhibit this transfer of energy. Some of the primary solvents used are toluene, xylene, anisole, dioxane, 1,2-dimethoxyethane and ethylene glycol monoethyl ether. Mixtures of these primary solvents are also used, e.g., 6 parts of dioxane, 1 part of anisole and 1 part of 1,2-dimethoxyethane, or 5 parts of dioxane and 1 part of ethylene glycol monoethyl ether.

The two essential ingredients of the liquid scintillator are the solvent or primary solvent which functions to absorb the beta radiation and transfer it to the scintillator or solute as it is also called. The literature on the solvents and solutes is often confusing both as to terminology and the effectiveness of various solutes or scintillators. This invention is based on the discovery of a class of compounds which act as primary solutes or as secondary solutes for liquid scintillation or liquid phospher counting.

A large number of liquid scintillator solutions have been investigated including the combination of p-terphenyl in toluene and such solutes as oligophenylenes, fluorenes, phenanthrenes, furans, benzoquinolines, 2-pyrones, oxazoles, thiazoles, benzoxazoles, pyrazolines, phenanthrolines, 1,3,4-oxadiazoles, the tetrazines, organometallics, esters of anthranilic acid and various other heterocyclic compounds. Review of these prior art disclosures leaves much to be desired in the selection of a scintillator because the methods of evaluation are not standardized, different experimenters use different techniques and different instrumentation. Accordingly, this art is highly empirical and the selection of a good primary or secondary solute or scintillation agent cannot be made on the basis of chemical structure and physical or chemical properties alone.

Furthermore, the technique is often difficult where weak beta emitters are being counted and the background emission level is high. In liquid scintillation tests the procedure is to place a radioactive sample in a vial containing a solvent such as toluene. A scintillating agent is added which has the property of emitting light in the visible spectrum upon excitation from the radioactive sample. The vial is placed adjacent the entry port of an instrument designed to transform a light signal to an electrical signal such as a photomultiplier tube. Low temperatures are used to reduce background emission along with lead shielding and use of low counting volume. Under these conditions, at each emission of the radioactive particle of the sample the scintillating agent emits a pulse of visible light which is changed to an electrical pulse by the photomultiplier tube. The signal from the photomultiplier tube (PMT) is passed to a suitable measuring instrument, such as a scaler, to indicate and/or record the time and magnitude of the PMT signal.

Where the light emitted by the scintillation agent is not within the sensitivities of the PMT, an auxiliary solvent, such as 1,4-di(2)-5-phenyloxazolyl-benzene, known as POPOP, is added for the purpose of transforming the emitted light from the scintillating agent, which may be 2,5-di(4-biphenylyl)oxazole (known as BBO) to a wave length detectable by the PMT. In these determinations the role of the scintillation solute is to emit a pulse of protons for each radioactive emission which deposits energy in the solution and the solvent must absorb energy and transfer it to the solute. A scintillation solute must, in addition to being available and economical, be an efficient light emitter, must produce a proton spectrum which in a conventional scintillation detector will be eventually transmitted and reflected in the optical system and converted into electrical energy by the PMT, and must be compatible with solubility restrictions imposed by the composition of the counting solution and by the temperature at which the counting is performed.

The best light emitters and scintillating agents form emission spectra of too short wave lengths to produce a proton spectrum which is eventually transmitted and reflected. Accordingly, it is conventional practice to employ a two-solute combination comprising a primary solute, to insure a large number of emitted protons, and a secondary solute, which becomes the actual emitter and agent for control of the spectrum of the protons.

In accordance with this invention ultraviolet light absorbers and scintillating agents are provided having the formulae:

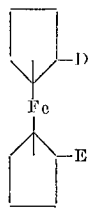

wherein D is

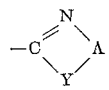

or

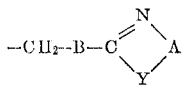

and A is a substituted or unsubstituted mono- or polynuclear aromatic radical, Y is O, NH or S, B is $C_1$ to $C_{10}$ alkylene or $C_6$ to $C_{14}$ arylene or unsaturated conjugated chain radicals of 2 to 6 carbon atoms and E is H, —COOH, —CH$_2$BCOOH or D.

Those compounds where D is

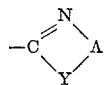

are described in copending application Ser. No. 248,255, filed Dec. 31, 1962, now abandoned, and are prepared by condensing 1,1′-ferrocene diacetic acid with an o-hydroxy, o-mercapto, or o-aminoarylamine, in the presence of polyphosphoric acid. The overall reaction is represented by the equations:

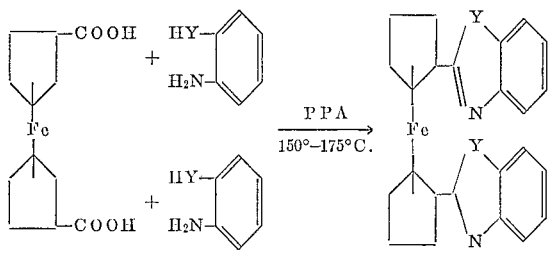

The Friedel-Crafts acylation reaction is applied using known techniques and conditions as is the oxidation step using sodium hypobromide. Suitable arylamines for the last step of the reaction are represented by the formula

wherein A is a substituted or unsubstituted mononuclear or polynuclear aromatic radical, having 6–14 carbon atoms in the aromatic portion and 1–20 carbon atoms in the substituted portion and Y is oxygen, sulfur or imino (=NH).

Examples of A are phenyl, naphthyl, anthryl, methyl phenyl, propyl phenyl, octyl phenyl, eicosyl phenyl, pentylnaphthyl, nonylanthryl, etc. Examples of arylamine reactants are o-aminothiophenol, o-diaminobenzene, 1-methyl 2,3-diaminobenzene, 1-ethoxy, 2,3-diaminobenzene, 1,2-diaminonaphthalene, 2,3-diaminonaphthalene, 1-propyl-3,4-diamino-naphthalene, 2-amino-3-mercaptonaphthalene, 1-octyl-2-amino-3-mercaptonaphthalene, 2-amino-3-hydroxy naphthalene, 1-nonyl-2-amino-3-hydroxy naphthalene, 1-eicosyl-2-hydroxy-3-aminonaphthalene, 2-amino-3-hydroxyanthracene, 1-tetradecyl-2-amino-3-hydroxyanthracene, 1-propoxy-2,3-diamonobenzene, 4-butoxy-2,3-diaminobenzene, 5-decyl-2,3-diaminobenzene, 5-dodecyl-2,3-diaminobenzene, 5-undecyl-2,3-diaminobenzene, 5-cyclopropyl-2,3-diaminobenzene, 4,5-cyclopropyl-2,3-diaminobenzene, 5-cyclohexyl-2,3-diaminobenzene, 6-cyclohexyl-1,2-diaminonaphthalene, 6-decyl-2-amino-3-mercaptonaphthalene, 6-dodecyl-2-amino-3-mercaptonaphthalene, 6-heptyl-2-amino-3-mercaptonanaphthalene, 7-tridecyl-2-hydroxy-3-aminonaphthalene, 5-tetradecyl-2-hydroxy-3-aminobenzene, 8-undecyl-2-hydroxy-3-aminoanthracene, 8-propyl-2-mercapt-3-aminoanthracene.

The preparation of compounds under this subgenus is illustrated by the following example.

A 113.4 g. portion of anhydrous aluminum chloride, 70 ml. of acetyl chloride, and 200 ml. of carbon disulfide were charged to a one-liter flask, equipped with an efficient stirrer, a reflux condenser, and a dropping funnel, and 52 g. of ferrocene were added over a period of one-half hour. The mixture was refluxed overnight, after which it was cooled and poured over 800 g. of ice and the complex was decomposed by adding hydrochloric acid. The resulting aqueous phase was extracted with benzene, dried, and concentrated, after which diacetyl ferrocene, having a weight of 25 g. and a melting point of 130–131° C., was recovered by crystallization.

In the next step of the preparation, 3.3 g. of sodium hydroxide and 28 cc. of water were placed in a precooled 250 cc. flask which was fitted with a stirrer and a dropping funnel, and then 1.5 cc. of bromine was added dropwise and this was followed with the diacetyl ferrocene prepared as above. At first, the mixture was orange-brown in color, but the color changed to dark brown after it had been heated and stirred for some time. After the mixture had been heated at 100° C. for three hours, it was cooled and extracted several times with ether, after which the ether extracts were combined and washed twice with sodium carbonate. The resulting product had an alkaline neutralization equivalent of 142 (the neutral equivalent of pure ferrocene dicarboxylic acid is 137) and a melting point, with sublimation, of 240°–250° C.

In the final step of the preparation, 0.10 mole of o-aminothiophenol and 0.05 mole of ferrocene dicarboxylic acid, were mixed and heated at 120° C. for two hours, in the presence of 100 g. of polyphosphoric acid, after which the product was poured over ice and filtered. The precipitate was washed with water, sodium carbonate solution and water, leaving the product 1,1′-bis(2-benzothiazolyl) ferrocene as a brownish solid. After the product had been recrystallized from water, its melting point was determined to be 58° C.

The preparation of ferrocene compounds to be used in accordance with this invention wherein D is

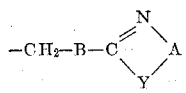

is described in copending application Ser. No. 285,866, filed June 6, 1963, now U.S. Patent No. 3,222,373, wherein ferrocene is acylated with an alkyl or aryl anhydride to form the keto acid. The keto acid is reduced to the corresponding carboxylic acid, and the carboxylic acid is condensed with an o-hydroxy, o-mercapto, or o-amino-aryl amine, as before disclosed herein, in the presence of polyphosphoric acid. This preparation is illustrated by the following example wherein 1-(2-benzothiazolyl)propyl ferrocene is prepared.

β-Ferrocenoylpropionic acid was prepared first by charging 9.29 g. of ferrocene and 11 g. of succinic anhydride to a three-necked flask (equipped with stirrer) and then slowly adding 200 cc. of methylene chloride and 11.6 g. of aluminum chloride. After the reaction mixture had been stirred for about two hours, it was poured onto ice, and the resulting mixture was extracted with ethylene dichloride. Next, the extract phase was washed with sodium carbonate, filtered through Celite, treated with dilute hydrochloric acid, and dried. The product, which weighed 4 grams, had a melting point of 168° C.

The resulting β-ferrocenoylpropionic acid was hydrogenated in 250 cc. of glacial acetic acid, over 850 mg. of platinum oxide, by maintaining the mixture under hydrogen at a pressure of 30 p.s.i.g. for 48 hours. The product was worked up in conventional fashion by dilution with water, extraction with ether, washing the ether extract several times with water, and extraction with sodium carbonate solution. The alkaline extract was acidified to yield 3.45 g. of γ-ferrocenylbutyric acid having a melting point of 116° C.

Finally, 50 g. of polyphosphoric acid were placed in a three-necked flask (fitted with stirrer) and heated to 100° C., after which 2.72 g. of the γ-ferrocenylbutyric acid and 1.5 g. of o-aminothiophenol were added slowly. After the mixture had been heated and stirred for about two hours, it was cooled and poured onto ice, and the mixture was filtered. The filtered solid product was washed with sodium bicarbonate solution and then with water, and finally dried. The 1-(2-benzothiazolyl)propyl ferrocene product weighed 2.5 g. and had a melting point of 108° C.

Acids and their anhydrides that can be used for the reaction to prepare the keto acid include:
Maleic anhydride
Succinic acid
Succinic acid anhydride
Glutaric acid
Glutaric acid anhydride
Adipic acid
Adipic acid anhydride
Pimelic acid
Pimelic acid anhydride
Suberic acid
Suberic acid anhydride
Azelaic acid
Azelaic acid anhydride
Sebacic acid
Sebacic acid anhydride
Fumaric acid
Fumaric acid anhydride
Chloromaleic acid
Chloromaleic acid anhydride
Citraconic acid
Citraconic acid anhydride
Phthalic acid or anhydride
Terephthalic acid or anhydride Species of compounds coming within the scope of this invention are:

Bisbenzoxazolylferrocene
Bisbenzoxazolylcyclopentadienyl iron
Bisbenzothiazolylferrocene
Bisbenzimidazolylferrocene
Bisnaphthothiazolylferrocene
Bisnaphthoxazolylferrocene
Bisanthrothiazolylferrocene
Bisanthroxazolylferrocene
Bis(-propylbenzothiazolyl)ferrocene
Bis(-nonylbenzothiazolyl)ferrocene
Bis(-octylbenzothiazolyl)ferrocene
Bis(-propylnaphthothiazolyl)ferrocene
Bis(-isobutylnaphthothiazolyl)ferrocene
Bis(-amylnaphthothiazolyl)ferrocene
1-(2-benzoxazolyl)phenyl ferrocene
1-(2-benzoxazolyl)naphthyl ferrocene
Bis(naphthoxazolyl)butyl ferrocene
Bis(naphthimidazolyl)phenyl ferrocene
1-(2-benzothiazolyl)butyl ferrocene
1-(2-benzothiazolyl)pentyl ferrocene
1-(2-benzothiazolyl)octyl ferrocene
1-(2-benzothiazolyl)-4-chlorohexyl ferrocene
1-(2-benzothiazolyl)-phenyl ferrocene
1-(2-benzothiazolyl)-naphthyl ferrocene
1-(2-benzothiazolyl)butyl ferrocene
1-(2-benzoxazolyl)isopentyl ferrocene
1-(2-benzoxazolyl)eicosyl ferrocene
1-(2-benzoimidazolyl)nonyl ferrocene
Bis(anthroxazolyl)decyl ferrocene
1-(2-anthrimidazolyl)-naphthyl ferrocene The compounds of this invention find utility in plastic compositions and coatings as ultraviolet light absorbing agents. The compounds are used in any amounts necessary to overcome the effect of ultraviolet radiation, i.e., sunlight. Examples of thermoplastic and thermoset materials that can be beneficiated by the compounds of this invention are:

PLASTICS

| Thermoplastics— | Effect of sunlight |
|---|---|
| Acetal | Chalks slightly. |
| Modified acrylics | Loss of strength. |
| Ethyl cellulose | Slight. |
| Cellulose nitrate | Discoloration. |
| Chlorinated polyether | Loss of ductility. |
| Nylon 6/6 | Discoloration. |
| Polyethylene (high density) | Requires black. |
| Polyethylene (med. and low density) | Surface crazing. |
| Polypropylene | Requires black. |
| Polycarbonate | Yellows. |
| Polystyrene | Yellows slightly. |
| Vinyl polymers | Darkens. |
| Thermosets: | |
| Casein | Color fades. |
| Melamine-formaldehyde | Color fades. |
| Phenol-formaldehyde | Darkens. |
| Polyesters | Slight. |
| Epoxy | Discoloration. |
| Allyl cast resins | Yellows. |
| Phenolics | Colors fade. |

The amount of the compounds of this invention used for the herein disclosed purposes will vary and any amounts which are effective for these purposes can be used. For scintillation work between about 0.05 to 15% by weight of the compounds may be used. Generally scintillators are used in concentrations of from 1 to 5 g./liter of solvent. These same concentrations will apply to ultraviolet absorption depending on the exposures contemplated, the effect of sunlight on the individual plastic or material to be protected and the physical state of the material. For spacecraft applications the upper limit of about 0.4 to 0.5% by wt. is advisable because of the severity of space radiation. Generally good ultraviolet protection is obtained at concentrations of about 0.05 to 8.0 wt. percent.

This invention is illustrated by examples wherein the ultraviolet absorptivity of several solutions of the compounds of this invention in isopropyl alcohol are tested using a Beckman DU spectrophotometer as described in copending application Ser. No. 161,942, filed Dec. 26, 1961, now U.S. Patent No. 3,242,807.

For scintillation counting the solutes, solvents and techniques outlined in Technical Bulletin, entitled "Solutes and Solvents for Liquid Scintillation Counting" (November 1960), by F. N. Hayes (Packard Instrument Co.), Nuclear-Chicago Technical Bulletin No. 11, entitled "How to Prepare Samples for Liquid Scintillation Counting" (1962), and Technical Measurement Corporation Bulletin 214B, entitled "Counting Soft Beta Emitters Using the LP-2A Liquid Phosphor Techniques," can be used. Other apparatus and techniques that may be used are described in United States Patents 2,986,635; 2,698,906 and 2,795,703. Suitable solvents for the scintillators of this invention are toluene, water, alcohol, and mixtures, and mixtures are required to obtain a solution or suspension. The chemical nature of the sample may vary and various isotopes such as $C^{14}$, $H^3$, $Na^{22}$ and $K^{40}$ can be determined by known procedures.

As illustrated by the foregoing examples the compounds of this invention used individually or as mixtures at concentrations ranging from about 0.05 to 8.0% by wt. effect an absorption of ultraviolet light to an extent making them useful in a number of applications. It is apparent that the individuality of absorptivity can be varied by varying the amount of the ultraviolet absorbers of this invention that are utilized. Generally, the use of large quantities of ultraviolet absorbers of this invention is not required since an increase in the amount of the compounds used will afford a somewhat greater absorption of ultraviolet light but the increase in absorption is generally not in proportion to the additional amount that has been incorporated.

A specific application of this invention will be apparent to one skilled in the art. For example, there are many processes and circumstances wherein it is desirable to filter out ultraviolet light to protect a material from a deleterious effect thereof. Where an ultraviolet light absorber is to be interposed between a source of ultraviolet light and the material to be protected therefrom, the compounds of this invention are incorporated in a barrier consisting of a material in which the compounds are compatible. The vehicle or barrier material for the ultraviolet absorbers may be transparent or translucent to visible light in those instances where it is also desirable that visible light will pass through to the material being protected. The vehicle or barrier may be opaque to visible light in those applications where there is no desire to let the visible light fall upon the material being protected.

Nonlimiting examples of barriers which may be used include the various plastic materials such as cellulose esters, including cellulose nitrate, cellulose acetate and the like; cellulose ethers as ethyl and methyl cellulose; the polystyrene plastics, such as polystyrene itself; polymers of ring-substituted styrenes, such as p-methylstyrene; vinyl polymers, such as polyvinylacetate polyvinylchloride, and the like; the acrylic resins, such as polymers and copolymers of methylacrylate, acrylamide, acrylonitrile, and the like; the polyolefins such as polyethylene, polypropylene, and the like; and polyesters, including unsaturated-modified polyesters. In addition to the various plastics, the barrier may be any of the number of waxes, both natural and synthetic, and coating materials such as varnishes, gums, shellacs, and the like.

The novel ultraviolet absorbers and scintillators of this invention are also useful as a coating for photographic film, having a plurality of light-sensitive emulsion layers, where it is desirable to prevent the action of ultraviolet light on the sensitive material. The deleterious ultraviolet light can be excluded by coating the film with a layer of transparent material, such as an inert gelatine, containing the ultraviolet absorbers. Alternatively, the ultraviolet absorbers of this invention may be incorporated in a sensitive emulsion layer or in a layer between two of the light-sensitive layers, or may be incorporated in a backing layer coated on the rear side of the film.

The ultraviolet absorbers of this invention can also be used as light filters, as for photographic purposes, by incorporating them in a suitable transparent material such as gelatine. If the filter is not sufficiently rigid to be used as such, it can be supported in any suitable manner, as between two pieces of glass.

In addition to the above uses and barriers, the ultraviolet absorbers may be utilized where it is desirable to increase the ultraviolet absorptivity of a material. For example, they can be used as "optical bleaches" to whiten or brighten textile fiber, paper, or similar materials. The addition of a small amount of the compounds to household soaps or synthetic detergents, such as quaternary ammonium compounds, sodium fatty alcohol sulfates, etc., results in the washed textiles absorbing ultraviolet light, thereby becoming whiter and brighter.

As briefly mentioned before, ultraviolet absorbers are utilized in plastics for stabilization of polymers of secondary ingredients against photocatalyzed deterioration of molded plastic articles, as well as to serve as an ultraviolet barrier. The photodegradation of plastics by ultraviolet light is a two-fold problem, loss of physical properties and discoloration. The addition of ultraviolet absorbers is the most widely used method of solving the problems. Examples of plastics in which it is desirable to incorporate ultraviolet absorbers are polyolefins, such as polyethylene, to prevent an ultraviolet-catalyzed oxidation reaction; polyester resins to prevent discoloration; polystyrenes to prevent discoloration, cellulosics, such as cellulose nitrate, to prevent discoloration and deterioration; and vinyl polymers to prevent discoloration. The ultraviolet absorbers can be dispersed throughout the mass of plastic or, if convenient, can be incorporated in the top layer of a laminated structure.

If desired, the foregoing compounds can also be utilized in liquid systems. The compounds are generally water-insoluble but are soluble in organic solvents, hydrocarbons, and the like. However, the water-insoluble compounds of this invention can be utilized in aqueous systems in combination with a suitable emulsifier.

When using the compounds of this invention as scintillating agents, they are employed in the manner known in this art in apparatus designed to measure electromagnetic or corpuscular radiation from naturally occurring or artificially produced radioactive isotopes or from machine-produced radioactive isotopes or from machine-produced radiation. In this application the compounds of this invention are used as scintillation solutes in which capacity they are distinguished by the characteristic that its members lose a significant fraction of the energy from their excitation molecules by the emission of light, which is measurable by means such as photomultiplier tubes and associated equipment. In this capacity the compounds of this invention are not only effective pulse height scintillation enhancers but are easy to prepare and quite inexpensive, these factors representing an advantage over the known pulse height enhancers such as POPOP and BBO. For this purpose the soluble compounds of this invention are used in concentrations of about 0.01 to 10 gm./liter of total sample.

To illustrate a photomultiplier tube (PMT) of the end-window type manufactured by the Radio Corporation of America and having identifying No. RCA 6655 was connected through a preamplifier manufactured by the Tracerlab Corporation bearing Tracerlab type p-20D. The instrument was set at full gain and connected to a pulse or count scaler having an input sensitivity of 0.25 volt. The PMT photocathode was cooled to 10° C. to −15° C. to reduce noise pulses.

The solute to be tested such as 1,1'-bis(2-benzothiazolyl)ferrocene and 1-[(2-benzothiazolyl)propyl]ferrocene is dissolved in toluene to concentrations of about 4 gm./liter and 0.5 ml. portions of these solutions are placed in 1 ml. beakers containing 0.1 ml. of a standard solution of a radioactive isotope of iodine ($I^{131}$) in toluene. The approximate specific activity of the radioactive solutions thus produced is 0.01 microcurie/ml. Solutions of toluene (0.6 ml.) and a mixture of 0.5 ml. of toluene and 0.1 ml. of the standard radioactive iodine solution are also placed in one ml. beakers for comparison. The solutions are then placed in turn, on the light sensitive window of the PMT and the pulses counted. About 25 to 35 counts per minute are recorded on blanks and counts of 35,000 to 50,000 per minute are recorded for the solutes of this invention.

The compounds of this invention are used in the known manner as either primary or secondary solutes, that is they may be used with such known scintillators or primary solutes as p-terphenyl in toluene, 2,5-diphenyloxazole (PPO), 2-phenyl-5-(4-biphenylyl)-1,3,4-oxadiazole, (PBD), 1,4-di[2-(5-phenyloxazolyl)]benzene (POPOP), 2-(4 - methoxyphenyl)-5-(4-biphenylyl)-1,3,4-oxadiazole, 2-(4-methoxyphenyl) - 5 - (4-biphenylyl)oxazole and the like. The solvents may be toluene, xylene, anisole, dioxane, 1,2-dimethoxyethane, ethylene glycol monoethylether and mixtures thereof.

The method and solvent compositions of this invention are applicable in the determination of beta ray emission activity of any radioactive sample including, but not limited to tritium, $C^{14}$, $H^3$ and $C^{14}$, $Na^{22}$, $K^{40}$, $I^{131}$, $Rb^{87}$, $In^{115}$, $Nd^{150}$, $Lu^{176}$, $Re^{187}$ and the like involving primarily beta ray emission, that is, the emission of negative electrons resulting from the transformation of neutrons into protons wherein there is an increase in nuclear charge by one unit, but no effect on mass number. Various samples of materials having the foregoing atoms which are characteristic beta ray emitters, e.g., organic compounds, urea, methanol, ethanol, acetylene, toluene, p-cymene, hexane, octane, acetic acid, caproic acid, phenylalanine and benzoic acid containing one or more $C^{14}$ atoms; stilbene with an $H^3$ atom; cholesterol and related steroids with $H^3$ and $C^{14}$ atoms, water with $H^3$ atoms; water in urine, plasma, and the like with $H^3$ atoms. Also inorganic compounds, such as, barium carbonate and sodium acetate with $C^{14}$ atoms and potassium chloride with $K^{40}$ atoms or salt with $Na^{22}$ atoms.

In these determinations the known methods of sample preparation are applied. Some scintillation samples may be solvents themselves, in which case it is only necessary to add the desired amount of solute or scintillation enhancer of this invention with or without an auxiliary solute such as POPOP, i.e., at a concentration of .05–0.3 g./l. for most determinations. Where the sample is soluble in the primary solvent, such as toluene, dioxane and the like, which should be of the best quality obtainable, at least "reagent grade," it is only necessary to dissolve the sample therein in the desired concentration to form the stock sample and place the stock sample solution in the vial of the instrument. If the sample is water or water-soluble, the procedure is to prepare the water solution of the sample and mix it with absolute alcohol in the vial or counting bottle. To this is added the stock solution of the sample in the primary solvent to form a homogeneous mixture, allowing the maximum toluene or solvent concentration consistent with the total volume desired and the amount of sample necessary for the proper testing. Any precipitates which form during this procedure are filtered off and alcohol-washed, and the filtrate is combined with the stock sample solution. Those samples which are insoluble in a primary solvent, water or alcohol are ground in a tissue homogenizer or a semimicro ball-mill and washed into the vial with the stock solution. Agitation is necessary before counting is conducted.

The known procedures for scintillation counting are applied and it is not considered necessary to elucidate thereon. A wide variety of apparatus is available commercially for these determinations. Thus the sample holders and mounts may be of the type manufactured by Nuclear-Chicago Corporation, model M2A, the scintillation detector may be model DS5–5 and self-quenching G-M tubes or counters models D22, D12, D50, D51 and D52, PMT devices and scalers from this source may be used, or the instruments for this purpose manufactured by Technical Measurement Corporation or Packard Instrument Company may be used. The procedures outlined or detailed in various technical bulletins published by these companies may be followed in carrying out the method of this invention using the new solutes described herein.

The embodiments of this invention in which an exclusive property or privilege is claimed are defined as follows:

1. A composition of matter consisting essentially of a textile washing compound selected from the class consisting of soaps and synthetic detergents and from about 0.05% to 15% by weight of said textile washing compound of a compound of the formula

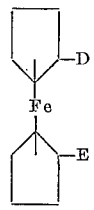

wherein D is a member of the group consisting of substituents having the formula

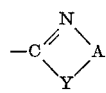

and

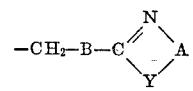

wherein A is a divalent aromatic nucleus of 6 to 14 carbon atoms, Y is a substituent of the group consisting of oxygen, sulfur, and imino, B is a member of the group consisting of unsaturated conjugated chain radicals of 2 to 6 carbon atoms, divalent aryl nuclei of 6 to 14 carbon atoms and $C_1$ to $C_{10}$ alkylene radicals, and E is a member of the group consisting of hydrogen, carboxyl radical, —$CH_2BCOOH$ radical and D.

2. In the method of detecting beta particles in a system wherein the beta particles are absorbed in at least one solvent, transmitted by said solvent to at least one scintillation solute, present in said solvent in an amount from 0.05 to 15 percent by weight, whereby said solute emits light in the visible spectrum, the visible light is transformed to an electrical signal and the time and magnitude of said electrical signal are measured, the improvement which comprises the step of transmitting said beta particles to a solute having the formula

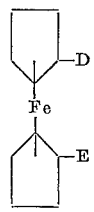

wherein D is a member of the group consisting of substituents having the formula

and

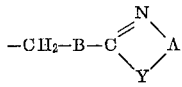

wherein A is a divalent aromatic nucleus of 6 to 14 carbon atoms, Y is a substituent of the group consisting of oxygen, sulfur, and imino, B is a member of the group consisting of unsaturated conjugated chain radicals of 2 to 6 carbon atoms, divalent aryl nuclei of 6 to 14 carbon atoms and $C_1$ to $C_{10}$ alkylene radicals, and E is a member of the group consisting of hydrogen, carboxyl radical, —$CH_2BCOOH$ radical and D.

3. The method of determining the radiation emission of a radioactive sample which comprises placing said sample and at least one scintillation solute in at least one solvent capable of absorbing the radiation emitted from said sample and transmitting the same to said solute whereby said solute emits light in the visible spectrum upon excitation from said sample, transforming the visible light to an electrical signal and measuring the time and magnitude of said electrical signal, said solute being a compound of the formula

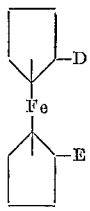

wherein D is a member of the group consisting of substituents having the formula

and

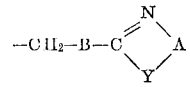

wherein A is a divalent aromatic nucleus of 6 to 14 carbon atoms, Y is a substituent of the group consisting of oxygen, sulfur, and imino, B is a member of the group consisting of unsaturated conjugated chain radicals of 2 to 6 carbon atoms, divalent aryl nuclei of 6 to 14 carbon atoms and $C_1$ to $C_{10}$ alkylene radicals, and E is a member of the group consisting of hydrogen, carboxyl radical, —$CH_2BCOOH$ radical and D, said sample containing said compound in an amount ranging from about 0.01 to 10 gm./liter of total sample.

4. The method in accordance with claim 3 in which said solute is 1,1′-bis(2-benzothiazolyl)ferrocene.

5. The method in accordance with claim 3 in which said solute is 1-(2-benzothiazolyl)propyl ferrocene.

References Cited

UNITED STATES PATENTS 3,222,373  12/1965  Rai _____ 252—300 X

OTHER REFERENCES

"Ferrocene Yields Ultraviolet Absorbers," Chemical and Eng. News, vol. 39, No. 38, Sept. 18, 1961, p. 51.

RICHARD D. LOVERING, Primary Examiner

U.S. Cl. X.R.

96—84; 252—89, 300; 260—45